US011255076B2

(12) United States Patent
Floyd et al.

(10) Patent No.: US 11,255,076 B2
(45) Date of Patent: Feb. 22, 2022

(54) SYSTEM AND METHOD FOR CONTROLLING AND MONITORING BATHROOM WATER FLOW

(71) Applicant: Abstract Engineering, Inc., Austin, TX (US)

(72) Inventors: Greg Floyd, Austin, TX (US); Ian Howard, Austin, TX (US); Rahul Verma, Austin, TX (US); Cameron Meziere, Austin, TX (US); Emily Hood, Cypress, TX (US); Michael Mayes, Spicewood, TX (US); Priya Sara Thomas, Rice, MN (US)

(73) Assignee: ABSTRACT ENGINEERING, INC., Austin, TX (US)

( * ) Notice: Subject to any disclaimer, the term of this patent is extended or adjusted under 35 U.S.C. 154(b) by 0 days.

(21) Appl. No.: 16/657,079

(22) Filed: Oct. 18, 2019

(65) Prior Publication Data

US 2020/0123745 A1 Apr. 23, 2020

Related U.S. Application Data

(63) Continuation-in-part of application No. 16/371,303, filed on Apr. 1, 2019, now abandoned.

(Continued)

(51) Int. Cl.

| | |
|---|---|
| ***E03C 1/05*** | (2006.01) |
| ***G05B 15/02*** | (2006.01) |

(Continued)

(52) U.S. Cl.

CPC .............. *E03C 1/055* (2013.01); *A47K 3/281* (2013.01); *F24H 9/2021* (2013.01); *G05B 15/02* (2013.01);

(Continued)

(58) Field of Classification Search

CPC ....... E03C 1/055; A47K 3/281; F24H 9/2021; G05B 15/02; G06F 3/011

(Continued)

(56) References Cited

U.S. PATENT DOCUMENTS

| | | | |
|---|---|---|---|
| 4,520,516 | A | 6/1985 | Parsons |
| 5,758,688 | A | 6/1998 | Hamanaka et al. |

(Continued)

FOREIGN PATENT DOCUMENTS

| | | |
|---|---|---|
| CN | 202778764 U | 3/2013 |
| CN | 204852449 U | 12/2015 |

(Continued)

OTHER PUBLICATIONS

Non-Final Office Action issued by the U.S. Patent and Trademark Office in the U.S. Appl. No. 16/371,303, dated Sep. 8, 2020, U.S. Patent and Trademark Office, Alexandria, VA. (10 pages).

(Continued)

*Primary Examiner* — Christine J Skubinna

(74) *Attorney, Agent, or Firm* — Buchanan Ingersoll & Rooney PC

(57) ABSTRACT

The disclosure relates to a device that saves water, energy, and money and may record the savings with a software analytics dashboard. The device allows cold water to flow out when the shower is first turned on and slows or shuts water flow once the water is heated and the shower is unoccupied. After the presence of the user is detected, the shower flow may resume.

32 Claims, 11 Drawing Sheets

Related U.S. Application Data

(60) Provisional application No. 62/748,047, filed on Oct. 19, 2018.

(51) Int. Cl.
*A47K 3/28* (2006.01)
*G06F 3/01* (2006.01)
*F24H 9/20* (2006.01)

(52) U.S. Cl.
CPC ...... *G06F 3/011* (2013.01); *G05B 2219/2642* (2013.01)

(58) Field of Classification Search
USPC .............................................................. 4/605
See application file for complete search history.

(56) References Cited

U.S. PATENT DOCUMENTS

| | | | |
|---|---|---|---|
| 5,979,500 | A | 11/1999 | Jahrling et al. |
| 6,078,253 | A | 6/2000 | Fowler |
| 6,206,340 | B1 | 3/2001 | Paese et al. |
| 6,314,380 | B1 | 11/2001 | Seip et al. |
| 7,304,569 | B2 | 12/2007 | Marcichow |
| 7,850,098 | B2 | 12/2010 | Vogel et al. |
| 8,347,427 | B2 | 1/2013 | Klicpera |
| 8,438,672 | B2 | 5/2013 | Reeder et al. |
| 8,807,521 | B2 | 8/2014 | Dunki-Jacobs et al. |
| 8,997,270 | B2 | 4/2015 | Murata et al. |
| 9,010,377 | B1 | 4/2015 | O'Brien et al. |
| 9,486,817 | B2 | 11/2016 | Patton et al. |
| 9,632,514 | B2 | 4/2017 | Marty et al. |
| 9,718,068 | B2 | 8/2017 | Rexach et al. |
| 9,783,964 | B2 | 10/2017 | Thompson et al. |
| 9,976,290 | B2 | 5/2018 | Evans et al. |
| 10,329,751 | B2 | 6/2019 | Schneider |
| 10,489,038 | B2 | 11/2019 | Klicpera |
| 10,745,893 | B2 | 8/2020 | Silverstein et al. |
| 2006/0231782 | A1 | 10/2006 | Iott et al. |
| 2009/0032610 | A1 | 2/2009 | Rosko |
| 2009/0293190 | A1 | 12/2009 | Ringelstetter et al. |
| 2012/0310376 | A1 | 12/2012 | Krumm et al. |
| 2013/0248019 | A1 | 9/2013 | Frick et al. |
| 2014/0076415 | A1 | 3/2014 | Dunki-Jacobs et al. |
| 2016/0024765 | A1 | 1/2016 | Hadia |
| 2016/0077530 | A1 | 3/2016 | Moran et al. |
| 2016/0129464 | A1 | 5/2016 | Frommer |
| 2016/0258144 | A1 | 9/2016 | Tayenaka et al. |
| 2016/0378322 | A1 | 12/2016 | Klicpera |
| 2017/0050201 | A1 | 2/2017 | Deivasigamani et al. |
| 2017/0328997 | A1 | 11/2017 | Silverstein et al. |
| 2018/0144316 | A1 | 5/2018 | Gal et al. |
| 2019/0086890 | A1 | 3/2019 | Bradley et al. |
| 2019/0089550 | A1 | 3/2019 | Rexach et al. |
| 2019/0368170 | A1 | 12/2019 | Austin-Dunkijacobs et al. |
| 2020/0225110 | A1 | 7/2020 | Knauss et al. |

FOREIGN PATENT DOCUMENTS

| | | | |
|---|---|---|---|
| CN | 205107493 | U | 3/2016 |
| CN | 205436066 | U | 8/2016 |
| CN | 205436070 | U | 8/2016 |
| CN | 205436075 | U | 8/2016 |
| CN | 205783854 | U | 12/2016 |
| CN | 205904001 | U | 1/2017 |
| CN | 106391339 | A | 2/2017 |
| CN | 205966215 | U | 2/2017 |
| CN | 106622709 | A | 5/2017 |
| CN | 107020208 | A | 8/2017 |
| CN | 107100234 | A | 8/2017 |
| CN | 107115983 | A | 9/2017 |
| CN | 107127060 | A | 9/2017 |
| CN | 207042691 | U | 2/2018 |
| CN | 107816090 | A | 3/2018 |
| CN | 207478849 | U | 6/2018 |
| CN | 105665161 | B | 7/2018 |
| CN | 108704769 | A | 10/2018 |
| CN | 106667326 | B | 1/2019 |
| EP | 3 147 577 | A1 | 3/2017 |
| EP | 3 279 612 | A1 | 2/2018 |
| JP | H05-192215 | A | 8/1993 |
| JP | 2012-117256 | A | 6/2012 |
| JP | 2017-169643 | A | 9/2017 |
| KR | 10-2018-0069316 | A | 6/2018 |
| WO | 2015/144939 | A1 | 10/2015 |

OTHER PUBLICATIONS

Final Office Action issued by the U.S. Patent and Trademark Office in the U.S. Appl. No. 16/657,160, dated Sep. 8, 2020, U.S. Patent and Trademark Office, Alexandria, VA. (41 pages).

Hawrylak et al., "HydroSense: A Self-Powered Wireless Device for Monitoring Water Usage in Hotel Showers," Proceedings of the Fifth IEEE Global Humanitarian Technology Conference (GHTC), (Oct. 8-11, 2015), (p. 314), (7 pages).

Applicant-Initiated Interview Summary (PTOL-413/413b) issued by the U.S. Patent and Trademark Office in the U.S. Appl. No. 16/657,160, dated Oct. 27, 2020, U.S. Patent and Trademark Office, Alexandria, VA. (2 pages).

Notification of Transmittal of the International Search Report (Form PCT/ISA/220 and PCT/ISA/210) and the Written Opinion of the International Searching Authority (Form PCT/ISA/237) dated Apr. 23, 2020, by the International Application Division Korean Intellectual Property Office in corresponding International Application No. PCT/US2019/057021. (16 pages).

SYSTEM AND METHOD FOR CONTROLLING AND MONITORING BATHROOM WATER FLOW

CROSS REFERENCE TO RELATED APPLICATIONS

This application claims priority to U.S. Provisional Patent Application No. 62/748,047, filed Oct. 19, 2018, and to U.S. application Ser. No. 16/371,303 filed Apr. 1, 2019, the disclosures of which are incorporated herein by reference in their entirety.

FIELD

The present disclosure is directed to reducing shower water and energy waste through use of an integrated system that includes an occupancy sensor, a temperature sensor, and a pressure sensor.

BACKGROUND

The fundamental problem to be addressed is called what is known as Shower Warm-up Waste. Lawrence Berkeley National Laboratory and other studies show that about 70% of bathers leave their showers unattended after their shower is warm, resulting in about $100 wasted per shower per year. According to some estimates, this may cost the typical hotel franchise about $30M per year. Across the U.S., this problem wastes billions of gallons of water, billions of kWh of energy and billions of dollars annually. In a society where resource conservation is rapidly growing in importance, Shower Warm-Up waste is another issue that must be solved to achieve sustainability.

SUMMARY

The hardware device may use a temperature sensor, a pressure sensor, an occupancy sensor, and a valve that stays open to allow the water to warm up, then closes to stop or reduce to a low volume stream wastewater flow if the bather is outside of the shower area and the water temperature is at or near steady state. Once the bather enters the shower area, the occupancy sensor detects their presence and resumes the flow of water automatically. The shower area can be defined as the entire shower stall or bathtub plus, a portion of the shower stall or bathtub, and/or up to about 2 or 3 feet outside the shower stall or bathtub (e.g., where a bathmat may be). In some embodiments, no change to user shower behavior is required. The hardware device may have a Wi-Fi adapter to connect with the analytics software in the cloud or a local server. The disclosure includes the assembly of sensor technologies and its integration with a cloud-based service. This innovative application in, for example, hotel showers saves cost and makes commercial buildings more energy and water efficient without reducing user satisfaction.

The present disclosure may provide a cost savings in less than one year and about a 400%, 5-year return on investment to the customer. Besides the savings, the present disclosure provides an analytics platform that monitors and reports shower maintenance requirements. The service is implemented with a combination of cloud-based analytics software and internet of things Wi-Fi connected hardware devices. The software comprises a user interface dashboard for the hotel owner (customer/user) to monitor the precise utility cost savings over the previous months and view the projected utility cost savings for the next month. Additionally, the present disclosure may provide user behavior data and maintenance alerts to the customer. The behavior data includes the length of the shower, water temperature, water pressure, flow rate, water and energy usage.

In addition to strong commercialization impact, the present disclosure has positive environmental impacts. The EPA and multiple studies claim that over 20% of the water used during an average shower in the U.S. may be wasted due to shower warm-up waste. This system will mitigate or eliminate that waste, and, upon successful commercial adoption at scale, will potentially save companies, cities, states, and individuals enormous amounts of water and energy. Eliminating shower warm-up waste amounts to eliminating at least 2 billion gallons of water and at least 1 trillion kWh of energy saved in the U.S. each year. The total cost of this waste is over $50 billion every year in the U.S. alone.

Further, the development of a novel human occupancy sensor resilient to the harsh shower environment and suited to internet of things devices, and a utility analytics platform that allows widespread metering and aggregation of local water and energy usage data will have very broad commercial, scientific, and technological applications outside of this specific application of the technology.

In one embodiment, the present disclosure relates to a device comprising an occupancy sensor; an integrated temperature and pressure sensor; a transmitter for wirelessly transmitting signals from the device to a processor or server; a receiver for wirelessly receiving signals from a processor or server to the device; a central processing unit; a solenoid valve configured for shower water to pass through when the valve may be open and to at least partially close when the occupancy sensor determines a shower bather space may be unoccupied and the temperature and pressure sensor determines that the water temperature may be at a steady state; and a power source to provide power to the device wherein said central processing unit may be configured to reduce power provided by power source by at least 90% when shower water may be not passing through the solenoid valve.

In another embodiment, the present disclosure pertains to an integrated system for reducing water waste comprising a) a plurality of devices wherein each device may be configured (1) to reduce a flow of water from the showerhead when a shower bather space may be unoccupied and the water temperature may be at a steady state and (2) to measure one or more water parameters and transmit said one or more water parameters to a processor; and b) a processor configured to receive one or more shower parameters from said plurality of devices. Wherein said one or more shower parameters comprises a volume of water saved by reducing the flow of water from the showerhead when the bather space may be unoccupied and wherein said processor may be configured to calculate the total volume of water saved by the plurality of showerheads.

DETAILED DESCRIPTION

Figure 1:
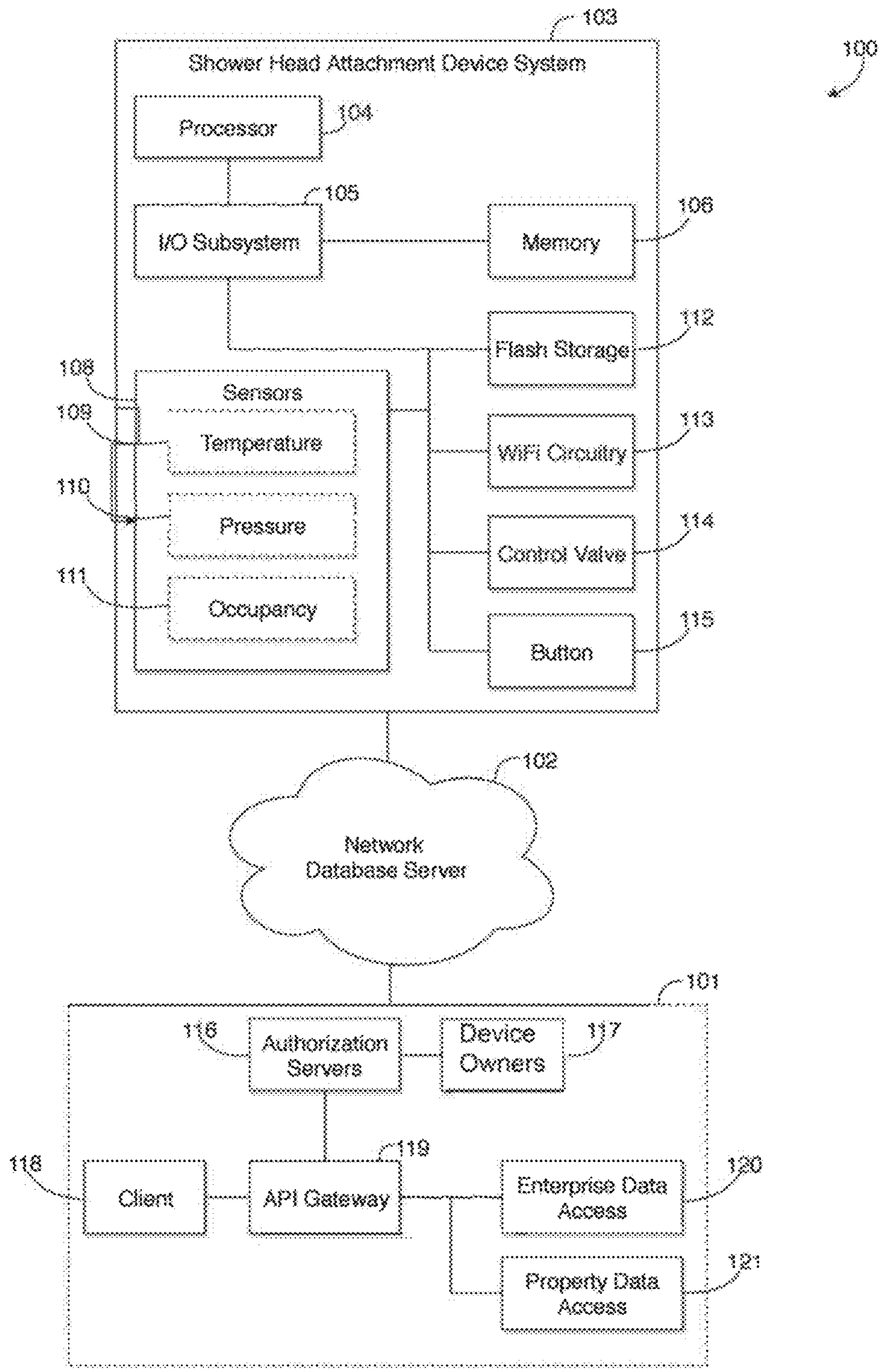
FIG. 1 is a block diagram of a system that controls the flow of water based on temperature and occupancy state and sends data to an external server or processor.

Referring to FIG. 1, in an illustrative embodiment, a system 100 for controlling water flow based on water temperature and occupancy and collecting and transmitting bather shower data includes one or more bathing devices 103 (e.g., a shower or bathing device), each of which may include a central processing unit or processor 104 which communicates to the bathing device's various sensors via a I/O subsystem 105 and at least two forms of data storage: RAM memory 106 and flash storage 112. The device 103 may include one or more sensors 108, which may include a temperature sensor 109, a pressure sensor 110, and an occupancy sensor 111. The device 103 may include an external button 115 for user or installation uses. Using the input from the sensors 108, the central processing unit 104 controls a control valve 114 which may be used to partially or fully limit the flow of water that the shower head emits. The device contains wireless (e.g., Wi-Fi) circuitry 113 to transmit shower data to an external network database server 102 (e.g., in the cloud) to store the shower data and transmit the data to an external or remote processor 101 which processes, organizes, and displays bather shower data on devices 103. The data first travels from the network database server 102 to the external processor 101 through one or more authorization servers 116 which secure the data. The data then travels through an API gateway 119 which organizes the data to be sent to the client server 118, one or more device owners 117, or users at a property, building, or room level, or to enterprise customers 120 or property entities 121 at a company or corporate level.

Figure 2:
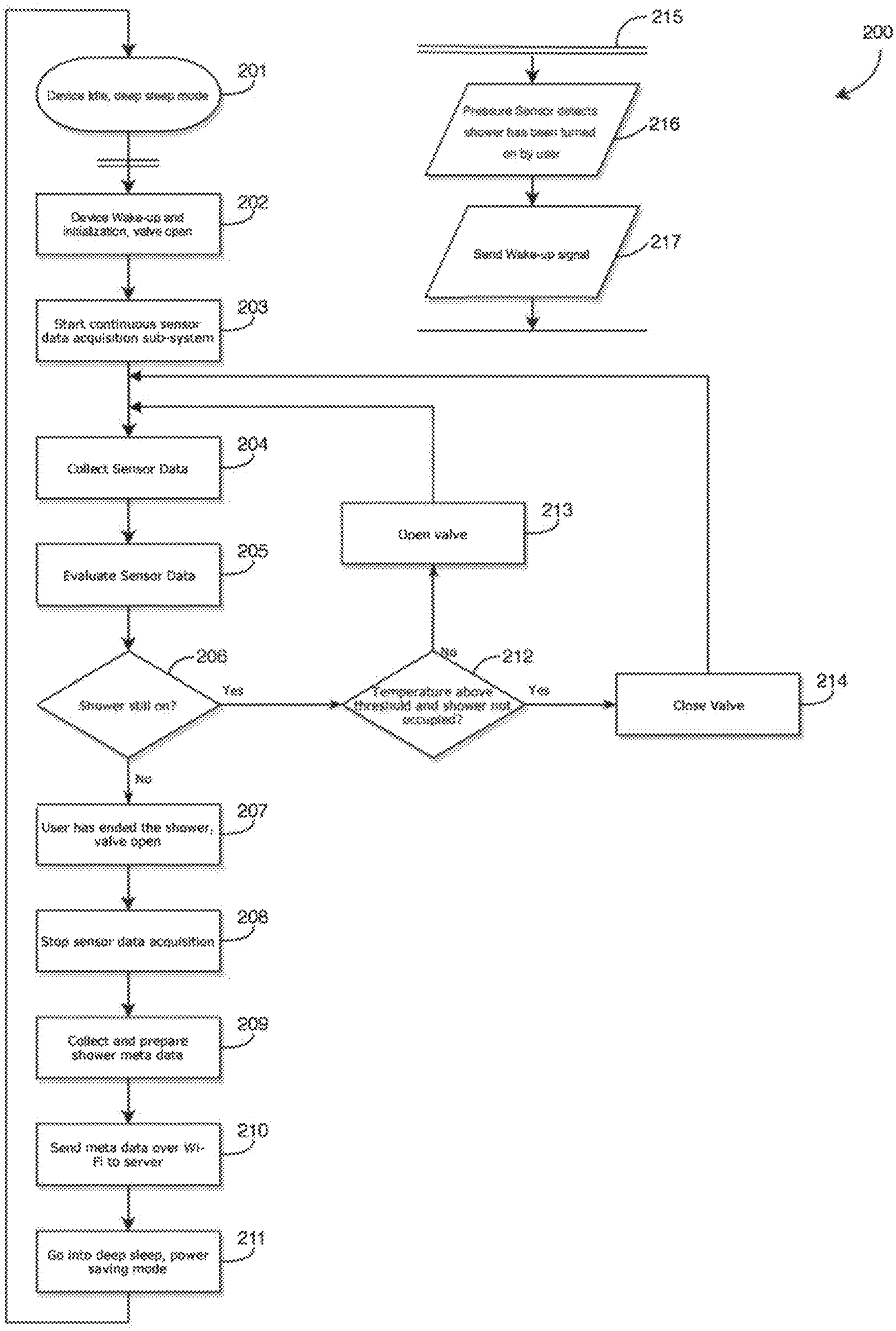
FIG. 2 shows a logic diagram of a system that controls the flow of water based on temperature and occupancy state and sends data to an external server or processor.

FIG. 2 is an illustrative embodiment of a flow chart 200 that describes the exemplary functionality of the bathing device 103. At step 201, the device 103 may stay in an idle, deep sleep mode in which power use and functionality of the device components may be limited (e.g., by at least about 90%) while the water in the bath stall may be turned off (e.g., via the shower handles, voice command, responsive sensor data, or the like). When the water may be turned on (e.g., via the shower handles, voice command, responsive sensor data, or the like), the device 103 firmware goes into its wake up initialization at step 215, in which at step 216 the pressure sensor detects that the water has been turned on at the handles by detecting the increase of the pressure inside the valve 114 and at step 217 the pressure sensor sends a wake-up signal to the central processing unit of the device 103, causing at step 202 the device 103 to wake up by going into full power mode with full functionality, immediately or almost immediately opens the valve 114 and at step 203 begins data acquisition using all sensors. The device 103 then goes into a loop in which it at step 204 collects sensor data and at step 205 evaluates the sensor data. If the device 103 finds that at step 206 the shower is still on by sensing the pressure inside the valve 114, it then checks if at step 212 the temperature is above a threshold and/or steady-state, and/or if the shower area is occupied by a human. In some cases, the threshold temperature may be set by a user or may be a preset temperature and/or a temperature determined to be within a safety zone. According to some aspects, the steady state may be reached when the water reaches the threshold temperature and is then held at or close to that threshold temperature. According to some aspects, the steady state may be when the temperature maintains a particular temperature (or small temperature range) for a set amount of time. For example, steady state may include a situation where the water may reach 80 degrees and may stay at or near 80 degrees for 15 seconds. In some embodiments, a threshold temperature may be establish or otherwise known by the device 103 (e.g., 95 degrees), and the device 103 may determine that a steady state of the water has been reached even if the temperature has not reached 95 degrees. For example, a steady state may be reached when the water reaches 85 degrees and stays at or near 85 degrees for a set amount of time (e.g., 15 seconds), even though the threshold temperature may be 95 degrees. In some embodiments, the range of temperature for steady state may be plus or minus 3 degrees Fahrenheit, or some other range (which may be set by a user or other device).

If the device 103 finds that either one of these is not true, at step 213 the valve 114 remains open and the loop returns to step 204 collect sensor data. If the device 103 finds that both are true, at step 214 the valve 114 will shut (although a low volume stream sufficient to maintain water temperature might continue) until the sensors detect that the shower area is occupied. If the at step 206 block finds that the water is off, this indicates that at step 207 the user has ended the shower by turning the water off at the handles and the valve 114 opens. Then, at step 208 the device 103 stops collecting sensor data, at step 209 the device 103 prepares the data that was stored from the shower event to be transmitted, at step 210 the device 103 transmits the data over Wi-Fi or some other wireless means to an external server and at step 211 the device 103 returns to sleep mode.

Figure 3:
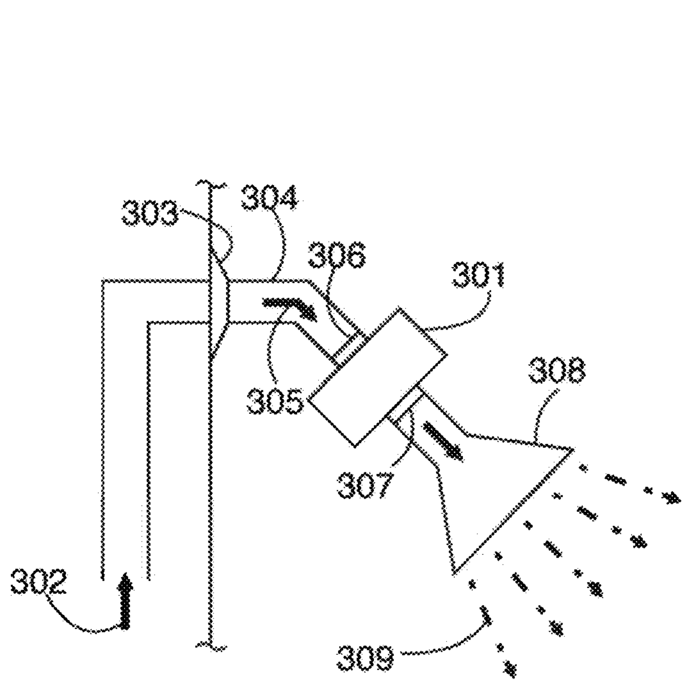
FIG. 3 shows a schematic of a shower head adapter embodiment of a system that controls the flow of water based on temperature and occupancy state and sends data to an external server or processor.

Referring to FIG. 3, an embodiment of the bathing device 103 embodied as a shower adapter device 301 as part of a shower head adapter system 300 that shows the external view of the device 103 when installed on a shower where the shower adapter device 301 may be installed adjacent to (e.g., behind) a shower head 308. The device 301 may be easily installed by unscrewing the shower head threads 307 from the shower arm threads 306, screwing the shower adapter device 301 onto the shower arm threads 306 and finally screwing the shower head threads 307 back onto the shower adapter device 301. When the device 301 is installed and the water is turned on by a user at the shower water handles, water flows through the shower piping 302, flowing through the shower arm 305, and flows out 309 of the shower head until the water is at a steady state and the shower is unoccupied. In some embodiments, the shower includes a shower arm escutcheon 303 and a shower arm 304.

Figure 4:
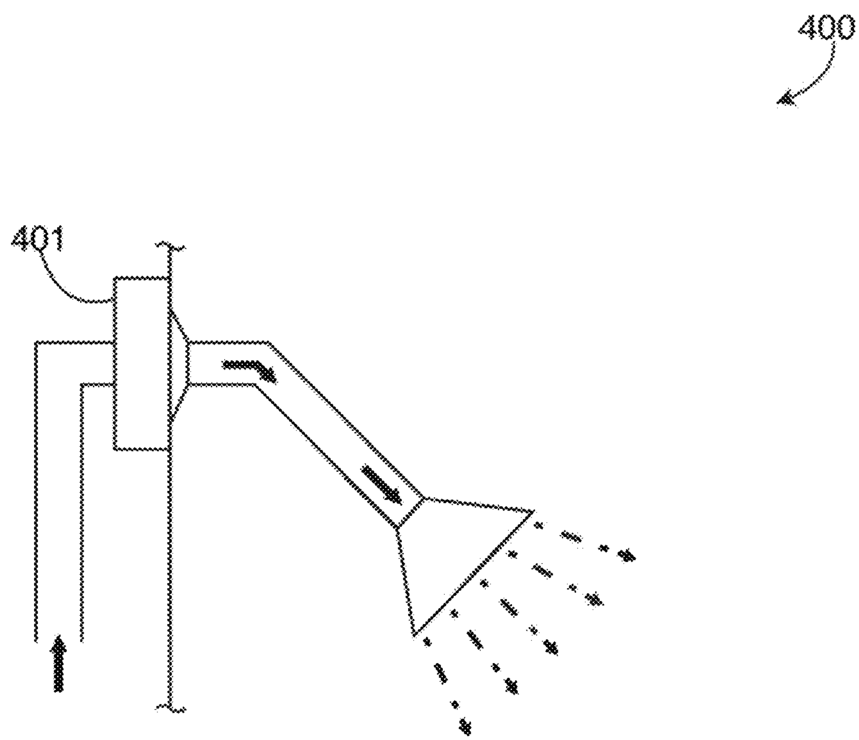
FIG. 4 shows a schematic of a shower escutcheon embodiment of a system that controls the flow of water based on temperature and occupancy state and sends data to an external server or processor.

Referring to FIG. 4, an embodiment of the bathing device 103 as a shower arm escutcheon 400 that shows the external view of the device 103 embodied as a device 401 (e.g., a shower arm escutcheon device 401) when installed on a shower where the shower arm escutcheon device 401 may replace a normal escutcheon and may be installed at least partially behind the bathroom shower stall wall.

Figure 5:
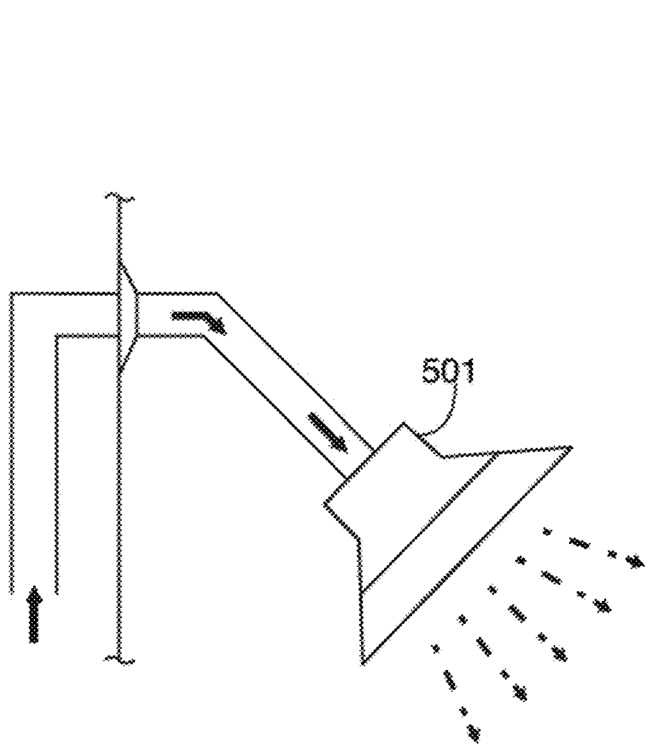
FIG. 5 shows a shower head embodiment of a system that controls the flow of water based on temperature and occupancy state and sends data to an external server or processor.

Referring to FIG. 5, an embodiment of the bathing device 103 embodied as a part of a shower head or as a shower head 501 in a shower head system 500 that shows the external view of the device 103 when installed on a shower where the shower arm escutcheon device 501 may replace a shower head and may be installed on a shower arm at the distal end. In some embodiments, the device 103 may be embodied as or adjacent to a faucet.

Figure 6:
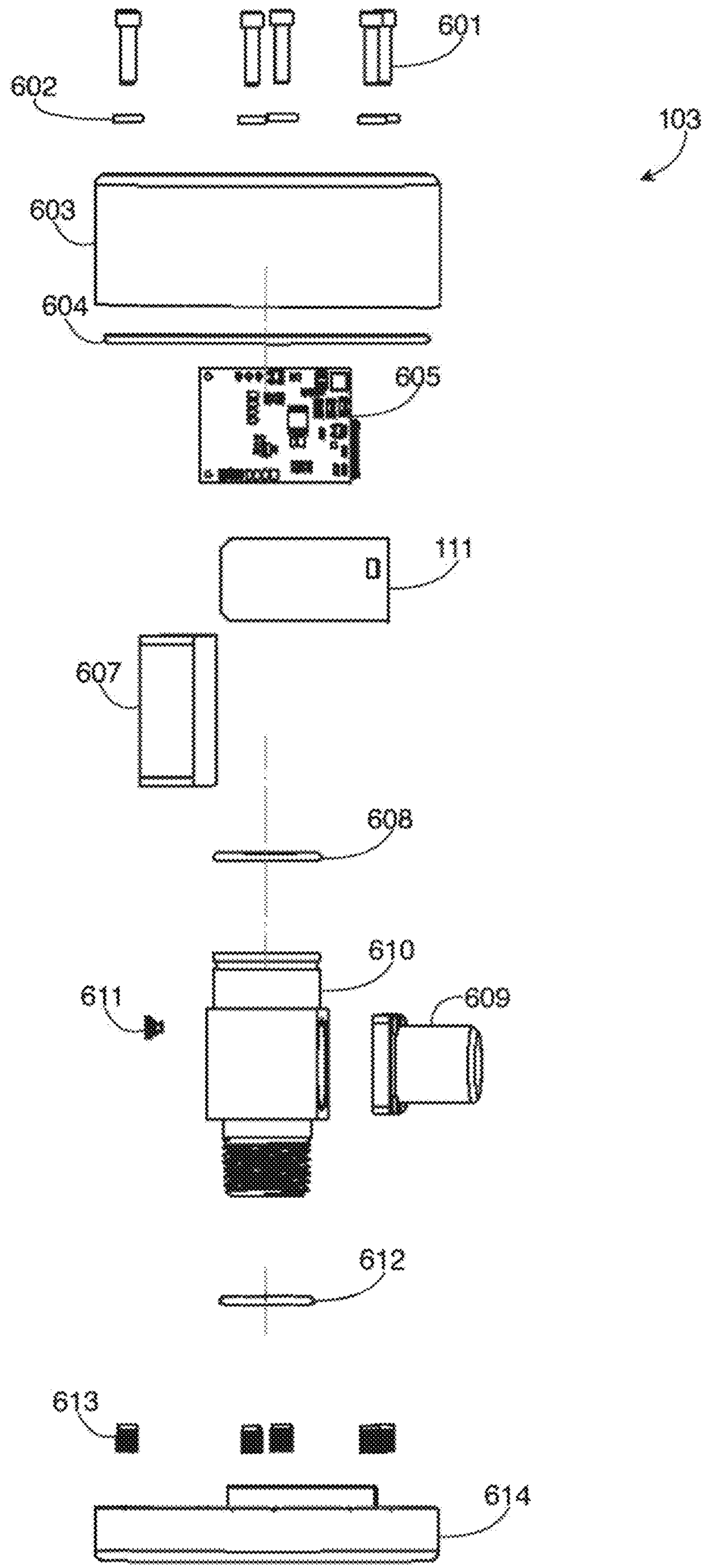
FIG. 6 shows an exploded view of every component of a system that controls the flow of water based on temperature and occupancy state and sends data to an external server or processor.

Referring to FIG. 6, an exploded view of an example of the bathing device 103 assembly that shows components and how they are assembled in conjunction with each other and the device enclosure. The device includes, for example, five screws 601 that screw into five screw inserts 613 which are embedded using pressure and/or glue to close the back device enclosure portion 603 and front device enclosure portion 614 together and apply pressure on the various device seals. The five screws 601 are assembled onto five ring seals 602 to prevent ingress by particulates into the enclosure 603, 614. The front ring seal 604 prevents water ingress into the enclosure through the connection between the front and back enclosure portions 603, 604. The central processing unit board 605 (embodying CPU 104, and the like), occupancy sensor 111, and battery holder 607 are installed in the enclosure and held in place by internal supports.

In the case of the occupancy sensor 111 being a radar sensor (e.g., a Doppler radar sensor), the sensor 111 may be formed with or have placed around or adjacent to the sensor 111 an optimally-shaped radar absorbing material (RAM). The placement of the radar absorbing material may act to focus a detection field of view range of a directional antenna of the radar sensor 111 toward one or more sources of water flow (e.g., the bath stall, a commode, a faucet, a sink, or the like) and may substantially limit the detection field of view range of the directional antenna of the radar sensor 111 on areas adjacent to the one or more sources of water flow as explained in greater detail below.

In some embodiments, the device 103 may include a plurality of sensors 111, where one sensor 111 may be focused on a first source or sources of water flow (e.g., bath stall), and another sensor may be focused on another source or sources of water flow (e.g., sink). In some cases, one or both of these sensors 111 may include or be formed with RAM.

A female valve seal 608 may be installed in a groove on the housing 610 of valve 114 and prevents ingress at the connection between the enclosure and the female valve inlet. A male valve seal 612 may be installed on the male side of the valve housing 610 without a groove and prevents ingress at the connection between the enclosure and the male valve outlet. All seals, 602, 604, 608 and 612 are held in place by pressure that comes from the 601 screws and the 613 screw inserts. The valve housing 610 includes a solenoid 609 that may be held to the valve hosing 610 using, for example, four screws and various seals. FIG. 6 illustrates an integrated pressure and temperature sensor 611 that may be held to the valve housing 610 using a potting compound.

Occupancy Sensor

In one embodiment the device 103 employs an occupancy sensor 111. The occupancy sensor 111 may be or include one or more types of sensors that may vary depending upon the type of device, power availability, other components, placement of the housing and other components relative to the sensor 111, and the like. Generally, any sensor may be suitable so long as it may be capable of determining whether a shower bather space may be unoccupied. Suitable sensors may include, for example, infrared, ultrasonic, microwave Doppler, laser, acoustic pressure, Frequency Modulated Continuous Wave radar, and the like. In some embodiments the occupancy sensor 111 comprises a Doppler radar sensor comprising a directional antenna. In some embodiments the human occupancy sensor 111 may be configured to generate an analog envelope of a bathing space within a shower.

In one embodiment, the human occupancy sensor 111 may be comprised of a microwave Doppler sensor that detects if a human may be in the bathing area by transmitting electromagnetic waves into an unoccupied shower area to determine a baseline. The occupancy sensor 111 receives a reflection of the emitted electromagnetic waves and sends the wave patterns to the CPU 104, which are stored there as a baseline. After the water is turned on, for example, the occupancy sensor 111 transmits additional electromagnetic waves into the bathing area (e.g., in or proximate to the bath stall), which may include a bather or might not include a bather, and receives electromagnetic waves multiple times per second, and then sends the received waves and/or wave patterns to the CPU 104. In some cases, there may be more than one sensor 111, such as being focused on one water source or having each respectively focused on a respective water source.

Figure 11:
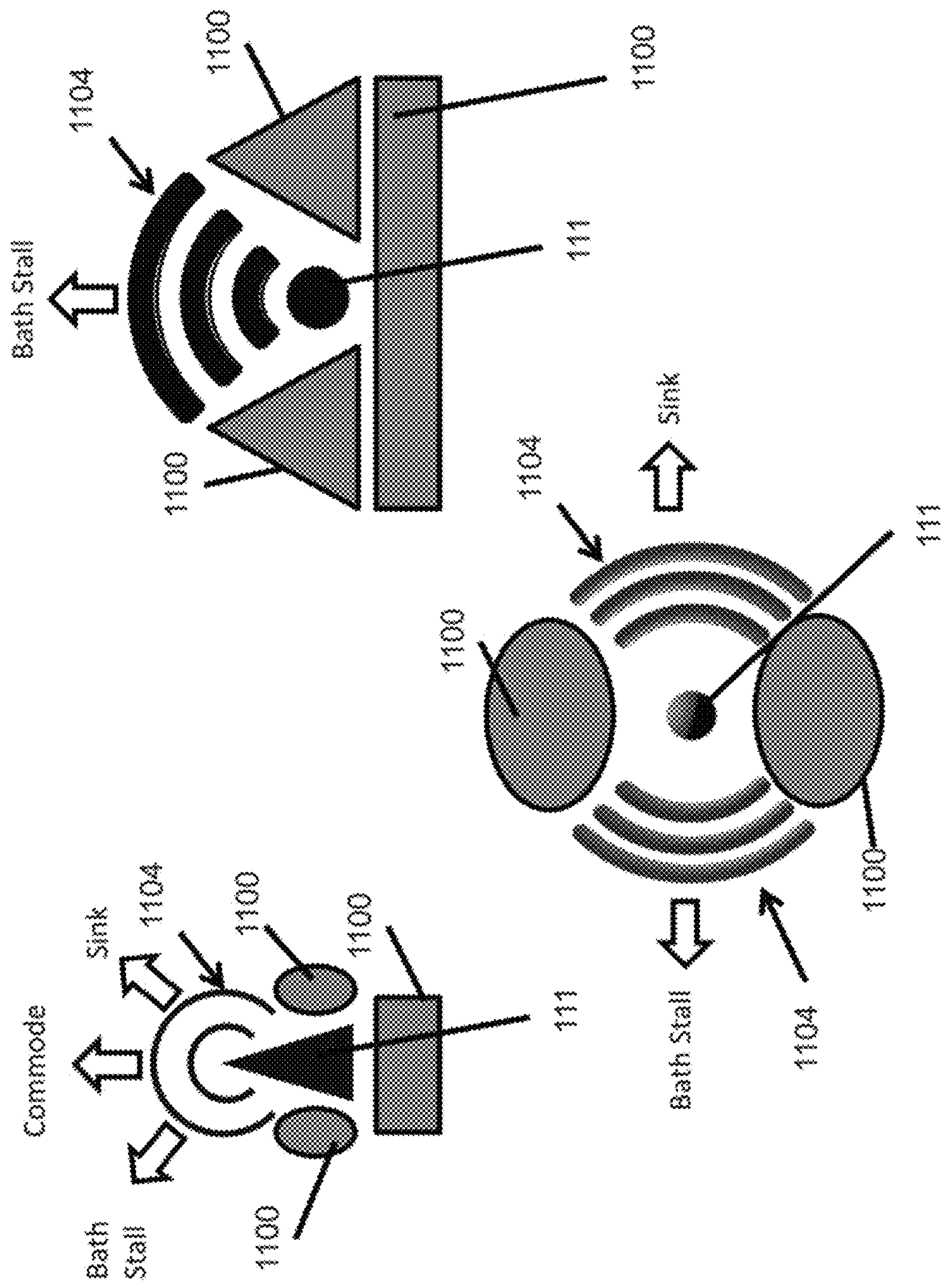
FIG. 11 illustrates example configurations of occupancy sensors and radar absorbing material in accordance with exemplary embodiments.

As shown in FIG. 11, in the case of the occupancy sensor 111 being a radar sensor (e.g., a Doppler radar sensor), the sensor 111 may be formed with or have placed around or adjacent to the sensor 111 an optimally-shaped radar absorbing material 1100 (RAM). FIG. 11 shows three examples of RAM 1100 in use with a sensor 111. The placement of the radar absorbing material 1100 may act to focus a detection field of view range 1104 of a directional antenna of the radar sensor 111 toward one or more sources of water flow (e.g., the bath stall, a commode, a faucet, a sink, or the like) and may substantially limit the detection field of view range 1104 of the directional antenna of the radar sensor 111 on areas adjacent to the one or more sources of water flow.

The radar absorbing material 1100 may facilitate a radio frequency lensing technique for use with the sensor 111. For example, as shown in FIG. 11, the field of view range 1104 of the sensor 111 may be directed in precise directions and may be less or not directed in others, such as with use of the radar absorbing material 1100. In this manner, the sensor 111 may gain spatial discrimination meaning that the sensor 111 may define the boundaries of the sensing/detection area 1104 (e.g., primarily directed at a sink and/or bath stall and the like). The radar absorbing material 111 may vary in size in the detection field path 1104 of the sensor 111, and may act like an optical lens that can be shaped bend, and/or focus the detection field of view range 1104 using the radar absorbing material 1100. In this manner, use of the radar absorbing material 1100 may increase signal-to-noise.

In some embodiments, the RAM 1100 may be reflective material that may act to reflect the signals coming from and/or going to the sensor 111. In some embodiments, the RAM 1100 may be opaque material that may absorb the signals coming from and/or going to the sensor 111. The RAM 1100 may have different levels or degrees of reflectance and/or absorbance. In some cases, reflective and absorbing RAM 1100 may be used. For example, the sensor 111 may be formed with or placed adjacent to reflecting RAM 1100, which may be backed by opaque RAM 1100. In another example, the sensor 111 may be formed with or placed adjacent to opaque RAM 1100, which may be backed by reflecting RAM 1100.

The shape and/or form of the RAM 1100 and sensor 111 may be optimally determined or formed. For example, the sensor 111 may be comprised in a radar dish (bow shaped) that may be lined with RAM 1100, where the sensor 111 may be placed at the focus of the radar dish. In another example, the sensor 111 may comprise a box-like shape, and the box may have an open edge where the sensor 111 may direct a detection field path 1104, where the walls of the box may be lined with RAM 1100. According to some aspects, there may be a known wavelength of the radiation associated with the sensor 111, and there is an optimum aperture, shape, and/or diameter for the sensor (e.g., bowl, box, etc.) based on this wavelength of this signal (e.g., microwave signal). This opiumism aperture, shape, and/or diameter for the sensor (e.g., bowl, box, etc.) may be used to develop the ideal shape for the design of the sensor 111.

As stated above, in some embodiments, the device 103 may include a plurality of sensors 111, where one sensor 111 may be focused on a first source or sources of water flow (e.g., bath stall), and another sensor may be focused on another source or sources of water flow (e.g., sink). In some cases, one or both of these sensors 111 may include or be formed with RAM 1100. In some cases, the use of RAM 1100 may allow for focusing the detection area for the sensor 111, such as focusing primarily or only on the bath stall to increase the accuracy for listening for or detecting a human in the detection area, such as shown in FIG. 11. In some cases, a less focused (or non-focused) sensor 111 may be used (sometimes in combination with a more focused sensor 111) to listen for or detect a human or water flowing etc. in the detection area that may include a plurality of areas in the bathroom (e.g., sink, toilet, etc.). In some cases, as discussed above and shown in FIG. 11, the RAM 1100 may be used to focus on a plurality of water sources.

An algorithm contained in the firmware of the CPU 104 compares the received waveforms, or an average of the received waveforms, that may be received in real time to the stored baseline waveforms. In one embodiment, if the firmware decides that the wave patterns that are currently being received are sufficiently different from the baseline wave pattern for a decided period of time, the CPU 104 determines that the shower area is occupied (e.g., by a bather), and the valve 114 may open. As an example, one sensor that may be used in this way may be a microwave Doppler radar sensor for detecting a human body that might include an output for operating an induction switch, for example, though other outputs would be acceptable depending on the specific embodiment.

In one embodiment, the human occupancy sensor 111 may be comprised of an ultrasonic sensor that detects if a human is in the bathing area by transmitting longitudinal waves into an unoccupied shower area to determine a baseline. The occupancy sensor 111 receives a reflection of the emitted longitudinal waves and sends the wave patterns to the CPU 104, which may be stored there as a baseline. After the water is turned on, for example, the occupancy sensor 111 transmits additional longitudinal waves into the bathing area (e.g., in or proximate to the bath stall), which may include a bather or might not include a bather, and receives electromagnetic waves multiple times per second and sends the wave patterns to the CPU 104. An algorithm contained in the firmware of the CPU 104 compares the received waveforms, or an average of the received waveforms, that may be received in real time to the stored baseline waveforms. In one embodiment, if the firmware decides that the wave patterns that are currently being received are sufficiently different from the baseline wave pattern for a decided period of time, the CPU 104 determines that the shower area is occupied (e.g., by a bather), and the valve 114 may open. As an example, a sensor that may be an ultrasonic sensor that may use pulse-echo and/or proximity sensing that can transmit and/or receive sound energy within ultrasonic ranges.

In one embodiment, the occupancy sensor 111 may be comprised of the previously described microwave Doppler sensor and an acoustic pressure sensor. In this embodiment, the microwave Doppler sensor may be used to detect if a person is in the bathing area when the water is off, and the acoustic pressure sensor may be used to detect if a person is in the bathing area when the water is on. The microwave Doppler sensor may detect if a person is in the bathing area when the water is off using the method previously described. The acoustic pressure sensor may detect if a human is in the bathing area when the water is on by receiving acoustic vibrations travelling through the air in the unoccupied shower area, which are stored as a baseline. After the water is turned on, for example, the occupancy sensor 111, the acoustic pressure sensor receives additional acoustic vibrations multiple times per second and sends the wave patterns to the CPU 104. An algorithm contained in the firmware of the CPU 104 compares the vibrations, or an average of the vibrations, that may be received in real time to the stored baseline vibrations. In one embodiment, if the firmware decides that the wave patterns or vibrations that are currently being received are sufficiently different from the baseline wave pattern or baseline vibrations for a decided period of time, the CPU 104 determines that the shower area is occupied, and the valve 114 may open.

In one embodiment, the human occupancy sensor 111 may be comprised of the previously described ultrasonic sensor and an acoustic pressure sensor. In this embodiment, the ultrasonic sensor may be used to detect if a person is in the bathing area when the water is off, and the acoustic pressure sensor may be used to detect if a person is in the bathing area when the water is on. The microwave Doppler and acoustic pressure sensors may detect if a person is in the bathing area using the methods previously described.

In one embodiment, the human occupancy sensor 111 may be comprised of the previously described microwave Doppler sensor, but the Doppler sensor outputs an analog envelope of the reflected microwaves to the central processing unit 104.

Temperature Sensor and Pressure Sensor

The sensor 109 for water temperature and the sensor 110 for pressure inside of the device 103 (e.g. in or adjacent to the valve 114) may be integrated such that one sensor may measure both water temperature and water pressure. While configured in any convenient manner which varies depending upon the device 103 and system, one embodiment of the device 103 may include having an integrated temperature sensor 109 and pressure sensor 110 may be in direct contact with water. In embodiments where the temperature sensor 109 and the pressure sensor 110 are separate, either or both sensors 109, 110 may be in direct contact with water. This may result in greater accuracy of the measurements.

The sensor 109 may determine whether the water has reached a steady state temperature, e.g., not varying by more than a few degrees (e.g., about plus or minus 3 degrees Fahrenheit) or less, by measuring the precise temperature of the water at short time intervals. In this manner, the device 103 and/or system 100 may recognize that the water may be at the temperature intended by the bather and, if a human is not detected by the occupancy sensor 111, then the flow of water may be reduced from the current flow rate, such as to about 5% or less, or less than 4%, or less than 3%, or less than 2%, or less than 1% of the full flow rate. In some embodiments, the flow of water may be greater than 0% in order that 1) the water stays at the bather's intended temperature, 2) the bather has an audible and visual queue that the water is still on, and/or 3) water pressure does not build up in the shower piping.

The integrated (or non-integrated) water temperature sensor 109 and pressure sensor 110 may be used to sense the pressure inside the valve 114 of the device 103 (via the pressure sensor 110). When there is no water in the valve 114, the pressure may be normally maintained at atmospheric pressure (1 atmosphere). When there is water in the valve 114, the pressure may be normally higher than atmospheric pressure. Every 2 seconds or 3 or 4 or 5 seconds or more, the sensor 110 accurately determines the pressure within the valve 114. If the sensor 110 determines that the pressure may be at or approximately close to atmospheric pressure, the sensor 110 may continue to determine the pressure every 2 seconds or more. If the sensor 110 determines that the pressure inside the valve 114 is above atmospheric pressure, the sensor 110 may send an interrupt signal to the main CPU 104 of the device 103. The interrupt signal may be received by the CPU 104 and causes the device 103 to change from "sleep mode", in which the device 103 may sense pressure once every 2 seconds or more, to "active mode", in which the device 103 may resume full functionality. Sensing the pressure also allows the flow rate of the water flowing through the device 103 to be calculated, such as by CPU 104 or remotely in the cloud or a local server.

The temperature and pressure information of the water that is measured by sensors 110 and 111 (e.g., every few seconds) may be used to determine savings data, usage data, maintenance emergency events (clogged shower head, scalding water, etc.), and other shower properties. This data may be sent to a remote device, processor, and/or server (e.g., server 102, server 116, device 101, and the like) to be recorded, processed, stored, or sent to an interested party. In some embodiments, the remote device may use this data in a machine learning algorithm, which, in some cases, may be used to create an optimized neural network that may be used by one or more devices 103 and respective sensors 109, 110, 111 to gather, measure, and categorize measurements. Further discussion of machine learning and neural networks are described herein, such as with respect to FIG. 9.

The integrated water temperature and pressure sensor may be designed to assemble into the solenoid valve 114 in a custom way. The assembly may allow the integrated sensor to 1) be in contact with the water running through the valve 114 without damaging the sensor and 2) be in contact with the water running through the valve 114 without causing water leaks outside of the valve 114.

Transmitter and Receiver

The device 103 may include a transmitter and receiver, which may be part of the Wi-Fi circuitry 113. While any type of transmitter and transmission may be employed, it may be preferable to use a wireless transmitter such that signals from the device 103 may be wirelessly transmitted to a processor or server (e.g., 102, 101, 116, and the like) using, for example, Wi-Fi or a similar mechanism. The transmitter may be configured to transmit one or more shower parameters. The one or more shower parameters to be transmitted may be selected from many different types of data. The shower parameters may include, for example, an amount of time a shower takes, a flow rate of water during a shower, a temperature of the water, a shower ID indicating, for example, which shower of many is being employed, a battery or other power level indicator of the device, a solenoid valve 114 state indicating whether it is fully open, partially open, or closed, an occupancy state of a given shower, and any combination of these or others. The operably linked to a remote device, such as a processor or server (e.g., 102, 101, 116, another device 103, and the like), which may employ the data to determine, for example, water saved, energy saved, dollars saved due to energy and/or water savings. The data may also be used to determine items like peak water usage, heating efficiencies, and a host of other potentially valuable information. In some embodiments, the remote device may use this data in a machine learning algorithm, which, in some cases, may be used to create an optimized neural network that may be used by one or more devices 103 and respective sensors 109, 110, 111 (and other components) to gather, measure, and categorize measurements. Further discussion of machine learning and neural networks are described herein, such as with respect to FIG. 9.

The device 103 may include a receiver, which may be part of the Wi-Fi circuitry 113. In this manner a processor or server (e.g., 102, 101, 116, another device 103, and the like) may send signals to the device 103. The receiver may be operably connected to the CPU 104 and/or solenoid valve 114 such that received signals may facilitate controlling the device 103. As just one example, if the processor, server, and/or CPU 104 receive data that indicate a scalding event, then a signal may be sent to the device 103 to close the solenoid valve 114 thereby protecting the bather. As another example, data can be sent to the CPU 104 through the receiver in the form of a software update if necessary. In some embodiments, a remote device may transmit an optimized neural network to device 103, which device 103 may then use to operate its components to gather, measure, and categorize measurements.

Central Processing Unit

The central processing unit 104 may be any convenient unit capable of being specifically programed to implement one or more desired functions of the device 103. Advantageously, the central processing unit 104 may in some embodiments comprise a Machine Learning algorithm, which, in one embodiment, may be configured to determine if the shower bather space is unoccupied based on the occupancy sensor output for example. The central processing unit 104 may be employed to at least control the solenoid valve 114 based on the occupancy sensor data. Further discussion of machine learning and neural networks are described herein, such as with respect to FIG. 9.

The central processing unit 104 may be made up of at least the following components: one or more microcontrollers or microprocessors, analog components such as resistors, capacitors, inductors, transistors, etc., and a Wi-Fi module or other transmitter. These components may be combined on a custom printed circuit assembly that can connect to any of component of the device 103, such as a power source, the human occupancy sensor 111, the pressure sensor 110, the temperature sensor 109, a user button 115, and a solenoid valve 114. The central processing unit 104 may be designed to be small (less than 1 $in^3$). The central processing unit 104 may be designed to use a small amount of power when in active mode (in the milli-Amp range) and an even smaller amount of power when in sleep mode (in the micro-Amp range). As an example, a microprocessor that may be configured for Internet of Things devices and applications.

The central processing unit 104 may control all or nearly all functionality in the device 103. It may receive, store, and/or transmit information from the human occupancy sensor 111, the temperature sensor 109, the pressure sensor 110, and the valve 114. The CPU 104 may use this information to determine if the shower space is unoccupied. The CPU 104 may control the solenoid valve 114 based on the occupancy determination. For example, responsive to determining that the temperature of the flowing water is at a steady state or greater than a temperature threshold and that the pressure is above a pressure threshold, the CPU 104 may at least partially close the solenoid valve 114 to decrease the flow rate of the water through the valve 114 after determining that the bath stall is unoccupied. In another example, responsive to determining that the temperature of the flowing water is at a steady state or greater than a temperature threshold and that the pressure is above a pressure threshold, the CPU 104 may maintain flow of the water at the current flow rate through the opened solenoid valve after determining that the bath stall is occupied.

The central processing unit 104 may use a variety of algorithms written into its firmware to determine if a shower bather space is unoccupied depending on the type of occupancy sensor 111 used and the type of information that is received from the occupancy sensor 111. This includes, but is not limited to, a naïve threshold algorithm which determines that a shower bather space is occupied if the amplitude of the waves or vibrations sent from the occupancy sensor 111 is above a certain set threshold, a calibration algorithm which determines that a shower bather space is occupied if the waves or vibrations sent from the occupancy sensor 111 are sufficiently different from a stored baseline, and/or a Machine Learning algorithm that is trained with hundreds or thousands or more test cases to determine the occupancy of a shower bather space. Further discussion of machine learning and neural networks are described herein, such as with respect to FIG. 9.

Solenoid Valve

While any convenient valve may be employed in the device 103 and/or system 100, a bi-stable latching solenoid valve 114 may be preferred. The solenoid valve 114 may be configured such that shower water may pass through it when the valve 114 is open. The solenoid valve 114 may be operably connected to the occupancy sensor 111 and the CPU 104. The device may be configured to at least partially or fully close the solenoid valve 114 when the CPU 104 determines a shower bather space is unoccupied and the water temperature is at least at a steady state based on information from the occupancy sensor 111, the temperature sensor 109, and/or the pressure sensor 110. In this manner, water and energy to heat the water are conserved and shower wastewater is reduced. It is preferred that the device be configured such that the flow of water is reduced to about 1% to about 5% of the full flow rate when (1) the occupancy sensor 111 determines that a bather space in a shower is unoccupied and (2) the temperature sensor 109, and/or the pressure sensor 110 determine that the water temperature is at a steady state. As an example, a valve that may be used may be a water solenoid magnetic pulse latching valve.

A bi-stable latching type of solenoid valve 114 may be a preferred type of valve 114 because it does not require a continuous flow of power to stay in the open or closed state, causing it to use a minimal amount of power. When the CPU 104 sends an "open" or "close" signal to the bi-stable latching solenoid, it will change position from or to the open or closed position, respectively, until another open or close signal is sent without a continuous use of signal data or power. This type of solenoid valve 114 may be also preferred because it can move from the open to closed or closed to open position in a very short amount of time—approximately 50 milliseconds.

There may be a hole in the valve 114 to allow at least a trickle of water to continue flowing while the water is on, even when the solenoid valve 114 is in the closed (or partially closed) position. The trickle allows (1) the shower water to stay heated, such as maintaining the temperature within a small range (e.g., plus or minus 3 degrees Fahrenheit) around the desired, steady state, or threshold temperature range, for when the bather returns to the shower, (2) the bather to have an audible queue that the water is still on, and (3) the pressure to not build up in the shower piping. The size of the hole may vary but in many applications it may be from 0.0025 to 0.0050 inches in diameter, e.g. about 0.0039 inches.

The solenoid valve 114 may include a square hole and a circular through hole that together allows the pressure sensor 110 and the temperature sensor 109 to be assembled into the valve 114 by being correctly placed in the holes and covered with an epoxy or potting compound. The holes and potting compound together allow the pressure and temperature sensor to become essentially a part of the valve 114 to (1) reduce overall space of the device and (2) reduce assembly time.

Power Source

The device may be powered in any convenient manner. Such power may be obtained from one or more batteries, electricity, solar, or even the heat or pressure of the water. It may be advantageous that the power source be operably connected to the central processing unit 104. In this manner the device can be configured such that the central processing unit 104 reduces power provided by the power source by at least 90% when shower water is not passing through the solenoid valve 114. In this manner, if the power source may be, for example, one or more batteries then the life of the batteries may be extended by at least 50, or at least 60, or at least 70, or at least 80, or at least 90% as compared to if the battery were constantly supplying power.

The central processing unit 104 reduces the power provided by the power source by (1) using the temperature sensor 109, and/or the pressure sensor 110 to learn the pressure inside the valve 114 every at least about 5 seconds and (2) shutting off at least the occupancy sensor 111 and the solenoid valve 114 and reducing the functions and thus the power draw of the central processing unit 104, the temperature sensor 109, and/or the pressure sensor 110 when the pressure may be below a set threshold. When the temperature sensor 109, and/or the pressure sensor 110 detects that the pressure inside the valve 114 rises above the set threshold again, it sends a signal to the central processing unit 104 to resume full functionality of all components of the device.

In one embodiment, the power source may be made up of at least about 2 or 3 or 4 or as many batteries as the circuit or device requires. In one embodiment, AA or AAA batteries may be chosen as the optimal power source in this embodiment because they are readily available and easily purchasable by hospitality owners and most other potential customers.

Button

In one embodiment, the device 103 may include a button 115 meant to be used by a user, a maintenance person, and/or an owner. The button 115 may be connected to the CPU 104 and, if pressed, can send a multitude of signals to the CPU 104. The CPU 104 will process each signal differently depending on the length of time that the button is pressed and the force in which it is pressed. The button 115 may be a plastic waterproof push-button switch that is less than 0.25 $in^2$ in size, but any convenient button may be used. The button 115 may have several functions, including but not limited to (1) a temporary "opt-out" function that will effectively disable some or all functionality of the device 103 for a set amount of time, (2) a more permanent disable function that will disable some or all functionality of the device 103 until the same action is taken to re-enable the device 103 and/or (3) a reset of the device 103 to shortly power off and repower the 103 device to remove the device 103 from any stuck or bugged state.

Device Enclosure

All or part of the device components are contained within a housing or enclosure 603, 614 that serves multiple purposes. The main purpose of the housing 603, 614 may be to protect the components from damage from outside sources, namely the water and other particulates in the air. The enclosure 603, 614 also protects from impacts or forces that might otherwise damage the internal components.

The enclosure 603, 614 may take a multitude of shapes, forms, and finishes. Possible enclosure shapes include but are not limited to, a cylindrical shape, a spherical shape, or a curved and contoured shape with flat front and back sides. Possible enclosure finishes include but are not limited to a chrome finish, a brushed metallic finish, or a polished metallic finish.

The enclosure 603, 614 may be made from a plastic or metal material. The plastic material may be a type of acrylonitrile butadiene styrene plastic called SABIC Cycolac® MG37EPX ABS manufactured and available for purchase by Saudi Basic Industries Corporation; SABIC Innovative Plastics (GE Plastics).

The enclosure 603, 614 may be constructed using a variety of methods. The most suitable method may be injection molding. This method may be most suitable because of the high volume, quick production, and low unit costs that it enables. This method can be done by a variety of manufacturers, including the private company GM Nameplate.

The enclosure 603, 614 finish may be achieved using a variety of methods. The most suitable method may be in-mold decoration. This method may be most suitable because it does not require a secondary process, meaning it reduces the time and costs to achieve a suitable metallic finish when manufacturing many devices. Also, the in-mold decoration process enables a realistic metallic finish without using any metal. Not using metal or limiting the amount of metal may be advantageous for multiple reasons, including that the metal may interfere with the human occupancy sensor 111.

The internal structure of the enclosure 603, 614 may be built so that each internal component may be held securely and at a precise distance from other components or the enclosure structure itself to produce optimal performance. As an example, the enclosure holds the occupancy sensor 111 at a precise distance from all other components and structures to ensure that the waves being emitted or received by the sensor are not interfered with. According to some aspects, the enclosure 603, 614 may act as an antenna extension which may help to prevent or decrease detuning of sensor 111 or an antenna of the sensor 111, which may act to bolster the accuracy of the sensor 111. For example, the enclosure 603, 614 and the internal components thereof may be formed into an integrated case designed that may have an shape, spacing tolerances between components, materials, and the like that may be optimized to improve the accuracy of sensor 111.

Other Device Parameters

The device 103 described herein may take any convenient form. For example, device 103 may be within or be a showerhead. In some cases, the device 103 may be an adaptor configured to operably connect to a showerhead either behind or in front of the showerhead. In yet another embodiment the device 103 may be configured to be installed behind a wall and operably connect to a showerhead through a flange. In some embodiments the device 103 may be configured to withstand a torque of a specific amount, such as at least 10, or at least 15, or at least 16 Newton meters (or more or less than any of these amounts). In this manner the device 103 may be more readily installable and removable without harming the device 103.

The device 103 may be configured to meet IEC standard 60529 IP 54. To achieve this, the device 103 may use a multitude of O-rings, O-ring grooves, and screws and screw inserts.

System

If a plurality of the devices described above may be configured in an integrated system 100 for reducing water waste and/or saving energy. In some embodiments, such a system 100 comprises a plurality of devices 103 wherein each may be configured (1) to reduce a flow of water from the showerhead when a shower bather space is unoccupied and the water temperature is at a steady state and (2) to measure one or more water parameters and transmit said one or more water parameters to a processor (e.g., a local processor 104 or a remote processor, such as 101, 102, a cloud device, and/or the like). The processor (e.g., 101, 102, 104, and the like) may be configured to receive one or more water parameters from said plurality of devices 103. In some embodiments, the one or more parameters may comprise a volume of water saved by a showerhead due to reducing the flow of water when the bather space is unoccupied. Other shower parameters may include, for example, an amount of time a shower takes, a flow rate of water during a shower, a temperature of the water, a shower ID, a battery level, a solenoid valve state, a human occupancy state, and combinations thereof. Advantageously, the processor (e.g., 101, 102, 104, and the like) may be configured to, for example, calculate the total volume of water saved by the plurality of showerheads. For example, a number of devices 103 (e.g., one hundred devices) may be operated at a site (e.g., hotel). Ten of those devices 103 may be operated as a control group, meaning that these devices 103 may have a valve that stays open (e.g., does not close or partially close), and these control group devices 103 may record data and/or one or more parameters, such as average length of a shower for that particular control group device 103. The average length of a shower for the control group devices 103 may be compared with the length of a shower for one of the ninety non-control group devices 103 (i.e., devices 103 that may have a valve 114 that may operate according to aspects discussed herein), where the length of the shower may be the amount of time the valve 114 is fully or about fully open. For example, the average length of a shower for the control group devices 103 may be nine minutes, and the average length of a shower for the non-control group devices 103 may be seven minutes, which may result in a savings on average of two minutes with the non-control group of devices 103.

In some embodiments the processor (e.g., 101, 102, 104, and the like) may be configured to calculate the energy saved by the plurality of devices 103. If desired, one or more devices 103 within the system 100 may be configured such that the flow of water may be reduced to 5% or less of the full flow rate when the bather space is unoccupied. According to some aspects, the system 100 may be configured to wirelessly transmit the one or more parameters from the plurality of devices 103 to the processor (e.g., 101, 102, 104, and the like), where the processor may use the parameters and any other information to calculate savings. In the example above, where the non-control group of devices 103 saved two minutes, the processor (e.g., 101, 102, 104, and the like) may multiply the two minutes saving by the average flow rate of water for the shower and/or associated device 103 to determine the total amount of water saved.

In some embodiments, the devices 103 may be used to monitor, collect, and/or transmit data from a number of sources of water, such as sources of water in the bathroom (e.g., the bath stall, a commode, a faucet, a sink, or the like). For example, a device 103 may be used to determine how long a sink is running, when a toilet has been flushed, when a faucet is running, and the like. The flowrates for these particular water sources may then be used along with this and/or other information to determine how much water is being used, and the like.

As described above, devices 103 within the system may comprise a solenoid valve 114 which at least partially closes when a shower bather space is unoccupied and the water is at least a steady state temperature. In some embodiments, a sensor 109 determines whether the water temperature is at a steady state by, for example, measuring a voltage relating to the temperature.

In some embodiments the processor may be configured to transmit summarized and/or calculated savings data, maintenance alerts, and other shower water data to an online dashboard that is at least accessible via a login system for purchasers or users of the device 103.

In some embodiments the processor may be configured to connect and send shower or water data to an independent software system that is owned by a hotel corporation or other entity.

Of course, the processor (e.g., 101, 102, 104, and the like) may perform many other functions as well. For example, it may be configured to control the plurality of devices 103.

Figure 7:
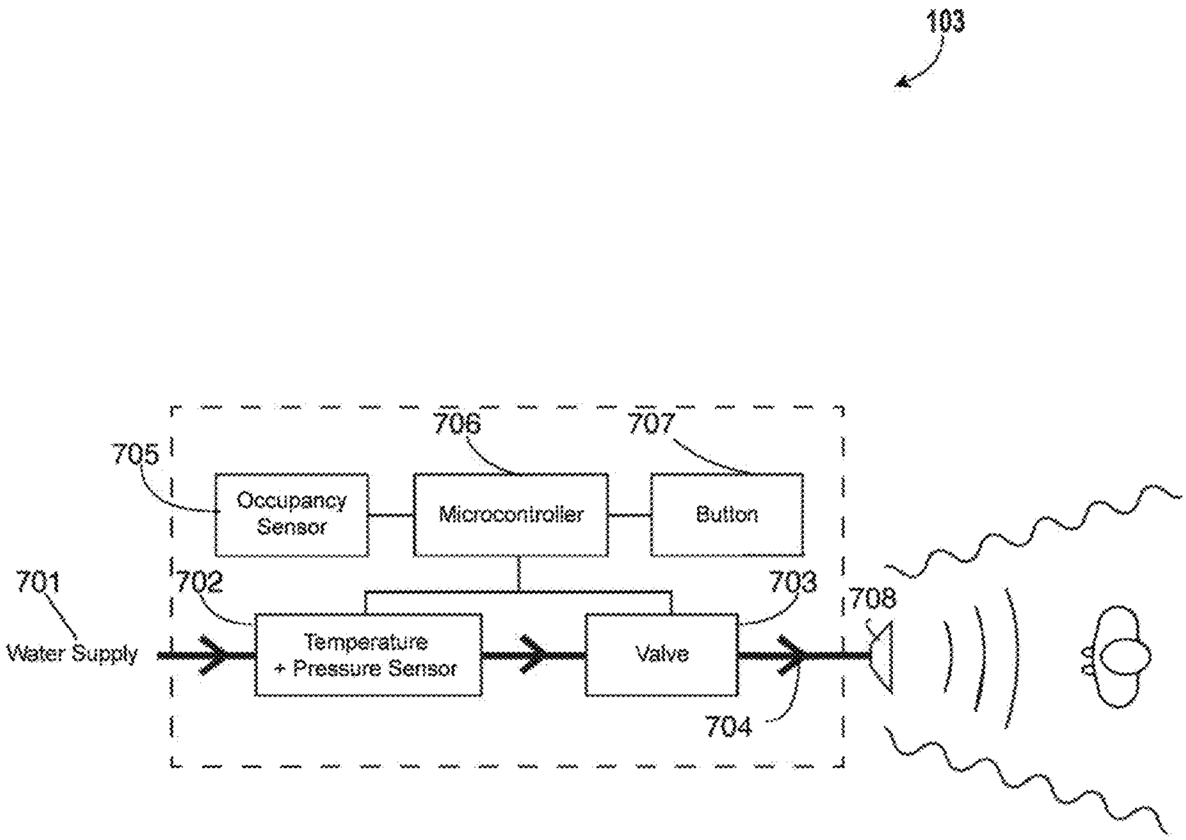
FIG. 7 is a block diagram of how information and water flows in one use case of a system that controls the flow of water based on temperature and occupancy state and sends data to an external server or processor.

Referring to FIG. 7, a system block diagram that shows a use-case in which a user is standing in the shower area using a shower in which the bathing device 103 is installed. The water supply 701 flows through an integrated pressure and temperature sensor 702 (embodying sensors 109 and 110 and valve 703 (embodying valve 114) and exits the shower head 708 at the same flow rate 704 and temperature as it entered. When flowing through the temperature and pressure sensor 702 and the valve 703, the microcontroller 706 (embodying central processing unit 104), controls the functionality of the valve 703 by collecting occupancy data from the occupancy sensor 705 (embodying sensor 111) and pressure and temperature data from the pressure and temperature sensor 702 and input from the user button 707, while controlling the valve 703. In this use-case, since a user is present inside the bathing area, the microcontroller 706 maintains the valve 703 at an open state which provides the full flow of water to the bather.

Figure 8:
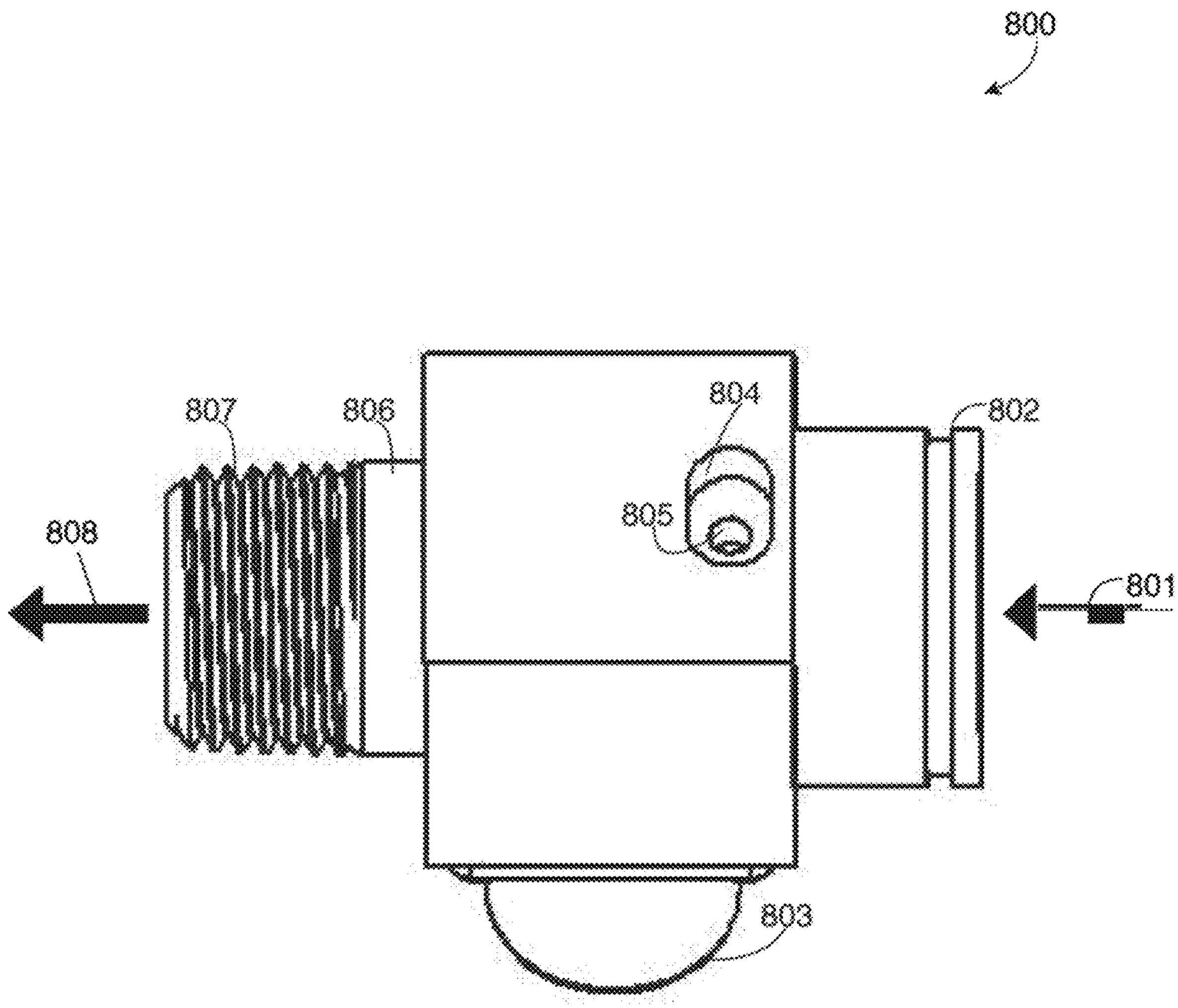
FIG. 8 shows an exploded view of the valve and pressure and temperature sensor assembly that is part of a system that controls the flow of water based on temperature and occupancy state and sends data to an external server or processor.

Referring to FIG. 8, an exploded view of an assembly 800 for device 103 that shows assembly and coupling features of the device 103, such as for valve 114 and the assembly process for the pressure sensor 110 and temperature sensor 109. According to some aspects, the water supply 801 flows from the shower piping through the female valve inlet. The female valve inlet contains a groove 802 that holds a sealing ring. The valve assembles with a solenoid 803 that partially or completely stops the flow of water. The assembly 800 contains a bore hole 804 and a smaller through hole 805 that allows the pressure sensor 110 and temperature sensor 109 to assemble into the assembly 800. The male outlet 806 of the assembly 800 is extended so that a sealing ring can fit on it. The male outlet of the assembly 800 contains external threading 807 to attach to similar female threads. After flowing through the assembly 800, the water from the shower exits 808 through the male outlet.

Figure 9:
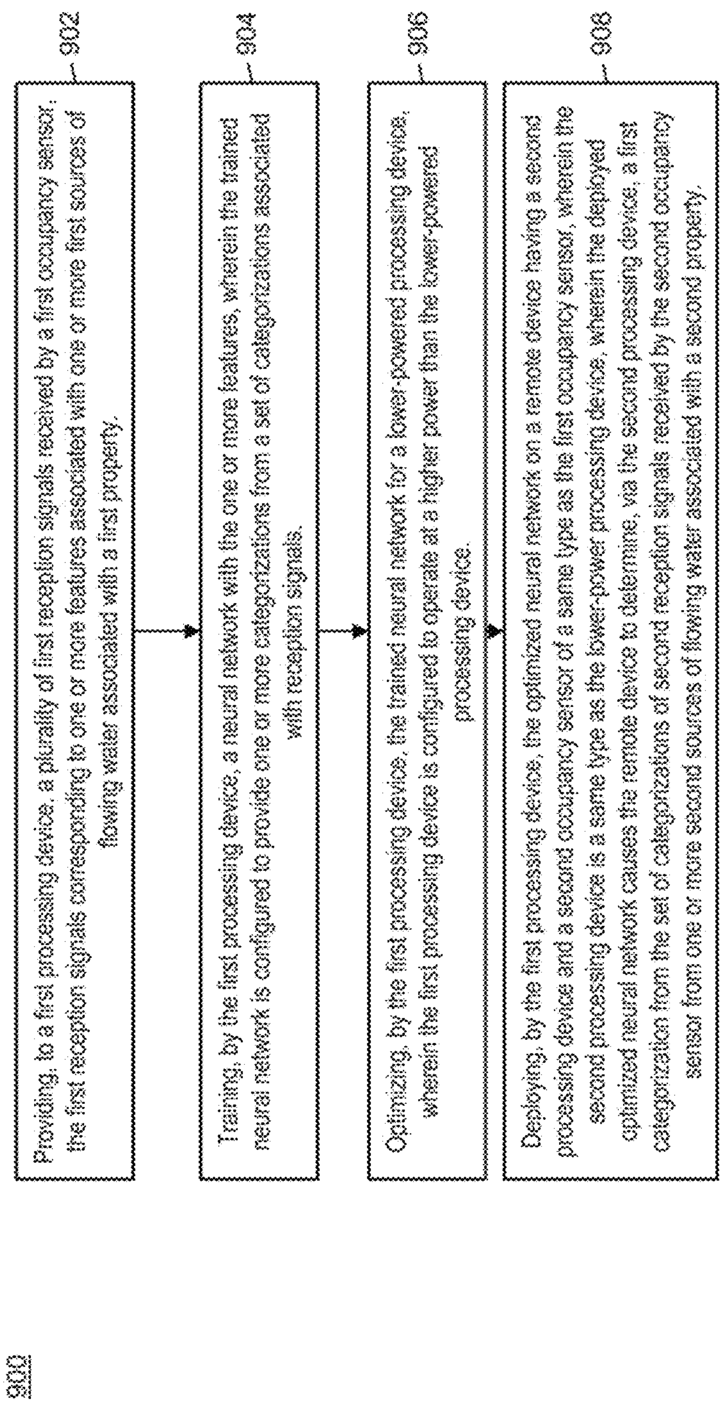
FIG. 9 illustrates an exemplary flow diagram for a process of implementing machine learning to implement and train a neural network in accordance with disclosed aspects and features.

FIG. 9 illustrates an exemplary flow diagram for a process 900 of implementing machine learning to implement and train a neural network in accordance with disclosed aspects and features. Process 900 may be implemented on one or more processing devices, such as devices 104, 102, 101, or combinations thereof and the like. For example, a remote server or a cloud based server may perform one or more steps of process 900. In some embodiments, device 103 may perform one or more steps of process 900.

At step 902, a plurality of first reception signals received by one or more first occupancy sensors 111 may be provided to a processor (e.g., processor 101). These first reception signals may correspond to one or more features associated with one or more first sources of flowing water associated with a property, room, or building. For example, these reception signals may correspond to reflections from a bath stall, a commode, a faucet, or a sink, such as in a hotel room, in a room in a residence, in a room associated with another type of structure, and the like. In some embodiments, a plurality of occupancy sensors 111 may provide these first receptions signals. The features associated with these sources of flow water may include one or more acoustic signals associated with the one or more first sources of flowing water. The features may include a state of a bather, such as the state of a bather being out of range of a field of view of the sensor, within the field of view of the sensor, one foot in a bath stall, at a commode, at a faucet, at a sink, the bather moving at different speed, or combinations thereof. The features may include a state of flowing water, such as water running, water trickling, water not running, or combinations thereof. In some other embodiments, the features may include how long a sink is running, when a toilet has been flushed, when a faucet is running, associated flowrates of water, and the like.

At step 904, the processor 101 may train a neural network with or based on the one or more features, wherein the trained neural network may be configured to provide one or more categorizations or labels from a set of categorizations associated with reception signals. For example, the categorizations may include the bath stall being occupied, the bath stall being unoccupied, water running, water trickling, water not running, or combinations thereof. In some embodiments, the categorization or labels may include:

1. Bather standing still inside the range, water trickling. Output→"Occupied"
2. Bather moving inside the range, water trickling. Output→"Occupied"

3. Bather standing still inside range, water on. Output→"Occupied"
4. Bather moving inside range, water on. Output→"Occupied"
5. Bather moving outside range, water trickling and water off. Output→"NOT Occupied"

Some other features that may be used to determine an unoccupied category may include:
a. User out of the detection range all together from a running shower
b. No one close to a non-running shower
c. Someone in the range but standing still with the shower on or off
d. Person outside of the range and moving all around in the bathroom—person running, walking, sitting/standing toilet, turning on the sink, and the like with shower on or off Some other features that may be used to determine an occupied category may include:
a. Waving a hand from the bathmat (proximity)
b. If a human is in the bathtub and water is not touching the human
c. One foot in water
d. Standing facing forward
e. Standing to left or right side
f. Standing with back to water
g. Squatting In some embodiments, the neural network may use machine learning to train and may use hundreds or thousands or more test cases to determine the categories (e.g., occupancy of a shower bather space).

At step 906, the processor 101 may optimize the trained neural network based on the type of processor that will be implementing the trained neural network. For example, the processor 101 may optimize the trained neural network for a lower-powered processing device, wherein the processing device 101 may be configured to operate at a higher power than the lower-powered processing device. For example, the low-powered processing device may have less processing capability than the processing device 101. In some embodiments, the low-powered processing device may be or may be the same type of processing device as CPU 104 of the device 103. This may allow the device 103 to implement the optimized trained neural network to categorize signal and information after the device 103 receives and/or downloads the optimized trained neural network from the process 101.

At step 908, the processor 101 may transmit or deploy the optimized neural network on a remote device, such as a device 103, that may include a processing device 104 that may be a same type or have the same or similar characteristics as the low-powered processing device. The remote device (e.g., device 103) may also have a second occupancy sensor of a same type as the first occupancy sensor used to capture the data and features on which the neural network is based. The deployed optimized neural network may cause the remote device (e.g., device 103) to determine one or more categorizations (from the set of categorizations) of reception signals received by the second occupancy sensor from sources of flowing water, such as in or associated with a second property, room, or building.

In some embodiments, the occupancy sensors 111 providing the receptions signals used to train the neural network may be the same occupancy sensors 111 used to implement the deployed optimized neural network. For example, a device 113 (or a plurality of devices 113) may capture data with sensor 111, transmit that data to remote processor 101, the processor 101 may use that received data to develop the optimized trained neural network, and may transmit that optimized trained neural network back to the device 113 (or to the devices 113) for use and execution. In some embodiments, the occupancy sensors 111 providing the receptions signals used to train the neural network may be separate from and/or distinct from the occupancy sensors 111 used to implement the deployed optimized neural network. For example, the occupancy sensors 111 providing the receptions signals used to train the neural network may be used in test environment or may be deployed in other separate devices 113 from the occupancy sensors that actually implement the deployed optimized neural network.

In some embodiments, the second source of flowing water may be the same type as the as at least one of the one or more first sources of flowing water. For example, if the neural network uses data from a sink water source, then the optimized trained neural network may be used by a device 113 to categorize signals reflected from a sink water source. In some embodiments, the second source of flowing water may be of a different type as the as at least one of the one or more first sources of flowing water. For example, if the neural network uses data from a sink water source, then the optimized trained neural network may be used by a device 113 to categorize signals reflected from a commode or shower water source. In another example, if the neural network uses data from a particular brand of sink water source, then the deployed optimized trained neural network may be used by a device 113 to categorize signals reflected from a brand different than that particular brand of sink (or of different dimensions, water flow rate, and the like).

In some embodiments, the signals used to train the neural network may be associated with a first type of property, such as a particular hotel room or particular bathroom having a particular arrangement, size, and the like. In some cases, the device 101 may transmit that optimized trained neural network to a device 113 (or to the devices 113) for use and execution in a property of the same first type. For example, the neural network may be developed for hotel rooms of a particular brand and layout, and the deployed trained neural network may be deployed to devices 113 for use in those hotel rooms of that particular brand and layout. In some cases, the device 101 may transmit that optimized trained neural network to a device 113 (or to the devices 113) for use and execution in a property of a type different from the first type. For example, the neural network may be developed for hotel rooms of a particular brand and layout, and the deployed trained neural network may be deployed to devices 113 for use in hotel rooms of another brand or layout.

Computer System Architecture

Figure 10:
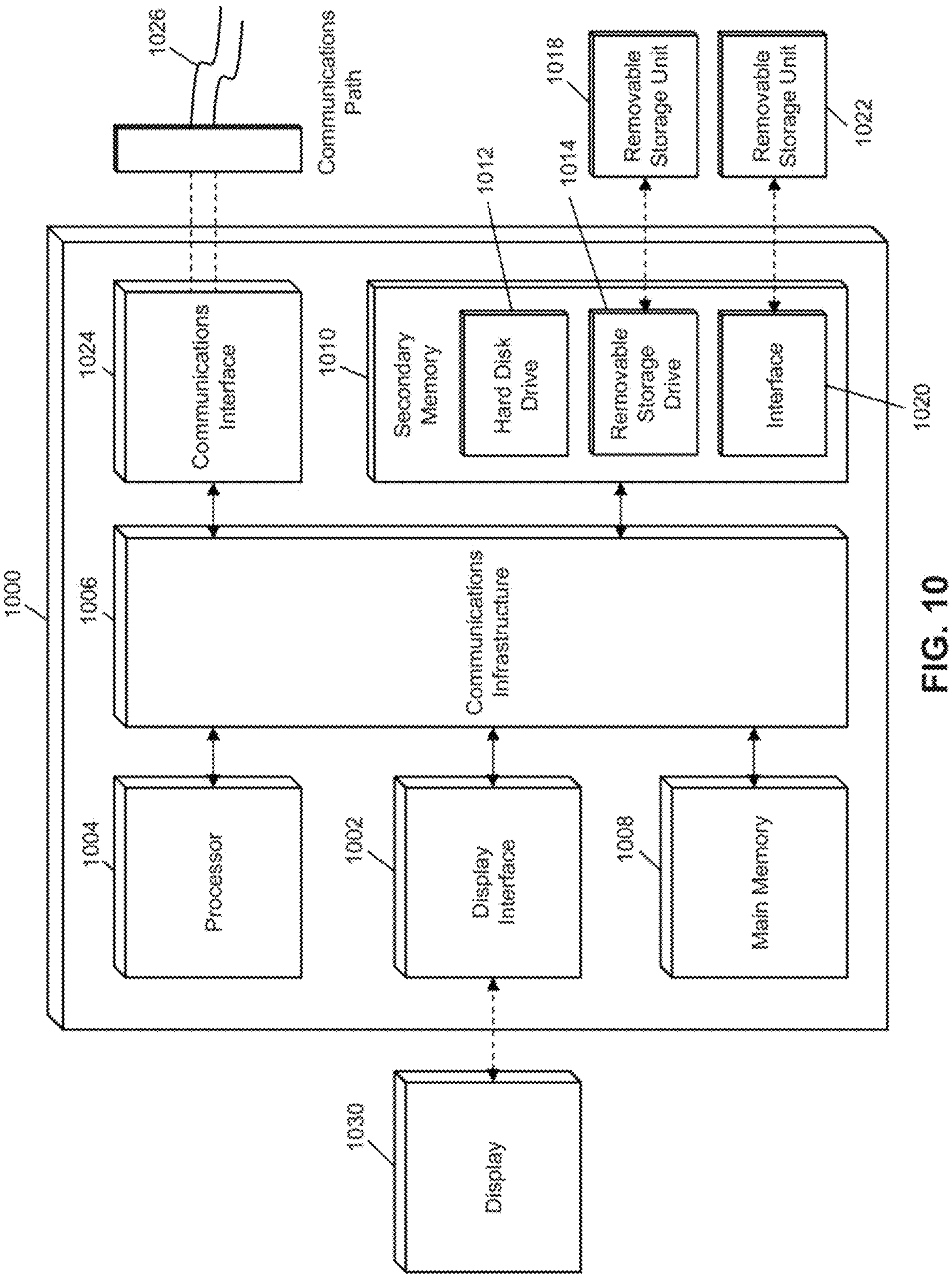
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the devices and/or components of system 100, such as devices 104, 103, 102, 101, and the like may be implemented in the computer system 1000 using hardware, non-transitory computer readable media having instructions stored thereon, or a combination thereof and may be implemented in one or more computer systems or other processing systems. Hardware may embody modules and components used to implement the methods disclosed herein.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods and processes, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

We claim:

1. A method of operating a bathing device for use in a bath stall, the bathing device comprising a housing, the housing containing a processing device, an inlet, a solenoid valve, a temperature sensor, a pressure sensor, and an occupancy sensor, the method comprising:

flowing water, received at the inlet, at a first flow rate through the solenoid valve, which is in an opened state, toward an outlet of the bathing device for use in the bath stall;

determining, by the processing device via the temperature sensor, a temperature of the flowing water inside the solenoid valve, wherein the temperature of the flowing water is variable;

determining, by the processing device via the pressure sensor, pressure inside of the solenoid valve;

transmitting, by the occupancy sensor, a transmission signal toward the bath stall;

receiving, by the occupancy sensor, a reception signal based on a reflection of the transmission signal;

determining, by the processing device, whether the bath stall is occupied based on comparing the reception signal and one or more baseline signals;

decreasing the first flow rate to below the first flow rate by at least partially closing the solenoid valve in response to (i) determining that the temperature of the flowing water inside the solenoid valve is at a steady state or greater than a temperature threshold, (ii) determining that the pressure inside the solenoid valve is above a pressure threshold, and (iii) determining that the bath stall is unoccupied; and maintaining flow of the water at the first flow rate through the solenoid valve in response to (i) determining that the temperature of the flowing water inside the solenoid valve is at a steady state or greater than a temperature threshold, (ii) determining that the pressure inside the solenoid valve is above a pressure threshold, and (iii) determining that the bath stall is occupied.

2. The method of claim 1, wherein the occupancy sensor comprises a Doppler radar sensor comprising a directional antenna.

3. The method of claim 2, further comprising providing an optimally-shaped radar absorbing material adjacent to the radar sensor, wherein placement of the radar absorbing material focuses a detection field of view range of the directional antenna of the radar sensor toward one or more sources of water flow and substantially eliminates the detection field of view range of the directional antenna of the radar sensor on areas adjacent to the one or more sources of water flow.

4. The method of claim 3, wherein the one or more water sources comprises the bath stall.

5. The method of claim 3, wherein the one or more water sources comprises a plurality of water sources.

6. The method of claim 1, wherein the bathing device comprises an adaptor configured to operably connect to a showerhead device.

7. The method of claim 1, wherein the decreased first flow rate is about 5% or less of the first flow rate.

8. The method of claim 7, wherein the decreased first flow rate is greater than 0% of the first flow rate.

9. The method of claim 1, wherein the bathing device further comprises a receiving device, the method further comprising:

receiving, by the receiving device, information from a remote computing device; and controlling, by the processing device, the bathing device based on the received information.

10. The method of claim 9, wherein the received information comprises a trained neural network for providing one or more categorizations from a set of categorizations associated with occupancy sensor reception signals, wherein the step of determining, by the processing device, whether the bath stall is occupied based on comparing the reception signal and one or more baseline signals further comprises determining, for the reception signal that is based on the reflection of the transmission signal, a first categorization from the set of categorizations associated with reception signals based on the received trained neural network.

11. The method of claim 10, wherein the first categorization comprises: the bath stall being occupied, the bath stall being unoccupied, water running, water trickling, water not running, or combinations thereof.

12. The method of claim 1, wherein the bathing device further comprises a transmitter device, the method further comprising transmitting one or more shower parameters toward a remote device, wherein said one or more shower parameters comprises an amount of time a shower takes, a flow rate of water during a shower, a temperature of the water, a shower ID, a battery level, a solenoid valve state, a human occupancy state, or combinations thereof.

13. The method of claim 1, wherein after determining that the bath stall is unoccupied, decreasing the first flow rate to below the first flow rate by at least partially closing the solenoid valve, the method further comprising, responsive to determining that the bath stall is occupied, opening, via the processing device, the solenoid valve to increase the decreased first flow rate.

14. A bathing device, comprising:

a housing having an inlet configured to receive flowing water at a first flow rate through a solenoid valve, which is in an open state, toward an outlet for use in the bath stall;

a processing device housed in the housing;

a temperature sensor comprised in the housing, wherein the processing device is configured to determine, via the temperature sensor, a temperature of the flowing water inside the solenoid valve, wherein the temperature of the flowing water is variable;

a solenoid valve housed in the housing;

a pressure sensor housed in the housing, wherein the processing device is configured to determine, via the pressure sensor, pressure inside of the solenoid valve; and an occupancy sensor housed in the housing, the occupancy sensor being configured to transmit a transmission signal toward the bath stall and to receive a reception signal based on a reflection of the transmission signal, wherein the processing device is configured to determine whether the bath stall is occupied based on comparing the reception signal and one or more baseline signals, wherein the processing device is configured to decrease the first flow rate to below the first flow rate by at least partially closing the solenoid valve in response to (i) determining that the temperature of the flowing water inside the solenoid is at a steady state or greater than a temperature threshold, (ii) determining that the pressure inside the solenoid is above a pressure threshold, and (iii) determining that the bath stall is unoccupied, wherein the processing device is configured to maintain flow of the water at the first flow rate through the solenoid valve in response to (i) determining that the temperature of the flowing water inside the solenoid is at a steady state or greater than a temperature threshold, (ii) determining that the pressure is above a pressure threshold, and (iii) determining that the bath stall is occupied.

15. The bathing device of claim 14, wherein the occupancy sensor comprises a Doppler radar sensor comprising a directional antenna.

16. The bathing device of claim 15, further comprising an optimally-shaped radar absorbing material provided adjacent to the radar sensor, wherein placement of the radar absorbing material focuses a detection field of view range of the directional antenna of the radar sensor toward one or more sources of water flow and substantially eliminates the detection field of view range of the directional antenna of the radar sensor on areas adjacent to the one or more sources of water flow.

17. The bathing device of claim 16, wherein the one or more water sources comprises the bath stall.

18. The bathing device of claim 16, wherein the one or more water sources comprises a plurality of water sources.

19. The bathing device of claim 14, wherein the bathing device comprises an adaptor configured to operably connect to a showerhead device.

20. The bathing device of claim 14, wherein the decreased first flow rate is about 5% or less of the first flow rate.

21. The bathing device of claim 20, wherein the decreased first flow rate is greater than 0% of the first flow rate.

22. The bathing device of claim 14, wherein the bathing device further comprises a receiving device configured to receive information from a remote computing device, wherein the processing device is configured to control the bathing device based on the received information.

23. The bathing device of claim 22, wherein the received information comprises a trained neural network for providing one or more categorizations from a set of categorizations associated with occupancy sensor reception signals, wherein the processing device is further configured to determine, for the reception signal that is based on the reflection of the transmission signal, a first categorization from the set of categorizations associated with reception signals based on the received trained neural network.

24. The bathing device of claim 23, wherein the first categorization comprises: the bath stall being occupied, the bath stall being unoccupied, water running, water trickling, water not running, or combinations thereof.

25. The bathing device of claim 14, wherein the bathing device further comprises a transmitter device configured to transmit one or more shower parameters toward a remote device, wherein said one or more shower parameters comprises an amount of time a shower takes, a flow rate of water during a shower, a temperature of the water, a shower ID, a battery level, a solenoid valve state, a human occupancy state, or combinations thereof.

26. The bathing device of claim 14, wherein:

the processing device is configured to decrease the first flow rate to below the first flow rate by at least partially closing the solenoid valve after determining that the bath stall is unoccupied, and responsive to determining that the bath stall is occupied, the processing device is configured to open the solenoid valve to increase the decreased first flow rate.

27. The method of claim 1, further comprising:

transmitting, by the occupancy sensor, one or more second transmission signals toward one or more sources of water flow;

receiving, by the occupancy sensor, one or more second reception signals based on reflection of the one or more second transmission signals; and transmitting, by the occupancy sensor, information associated with the one or more second reception signals for determining metering information associated with the one or more sources of water flow.

28. The bathing device of claim 14, wherein the occupancy sensor is configured to:

transmit one or more second transmission signals toward one or more sources of water flow, receive one or more second reception signals based on reflection of the one or more second transmission signals, and transmit information associated with the one or more second reception signals for determining metering information associated with the one or more sources of water flow.

29. The method of claim 1, wherein the temperature of the flowing water is determined to be at the steady state after the temperature of the flowing water remains at or near a first temperature for a predetermined period of time.

30. The bathing device of claim 14, wherein the temperature of the flowing water is determined to be at the steady state after the temperature of the flowing water remains at or near a first temperature for a predetermined period of time.

31. A method of operating a bathing device for use in a bath stall, the bathing device comprising a housing, the housing containing a processing device, an inlet, a solenoid valve, a temperature sensor, a pressure sensor, and an occupancy sensor, the method comprising:

flowing water received at the inlet at a first flow rate through the solenoid valve, which is in an opened state, of the bathing device toward an outlet for use in the bath stall;

determining, by the processing device via the temperature sensor, a temperature of the flowing water, wherein the temperature of the flowing water is variable;

determining, by the processing device via the pressure sensor, pressure inside of the solenoid valve;

transmitting, by the occupancy sensor, a transmission signal toward the bath stall;

receiving, by the occupancy sensor, a reception signal based on a reflection of the transmission signal;

determining, by the processing device, whether the bath stall is occupied based on comparing the reception signal and one or more baseline signals;

responsive to determining that the temperature of the flowing water is at a steady state or greater than a temperature threshold and that the pressure is above a pressure threshold, decreasing the first flow rate to below the first flow rate by at least partially closing the solenoid valve after determining that the bath stall is unoccupied;

responsive to determining that the temperature of the flowing water is at a steady state or greater than a temperature threshold and that the pressure is above a pressure threshold, maintaining flow of the water at the first flow rate through the opened solenoid valve after determining that the bath stall is occupied;

transmitting, by the occupancy sensor, one or more second transmission signals toward one or more sources of water flow;

receiving, by the occupancy sensor, one or more second reception signals based on reflection of the one or more second transmission signals; and transmitting, by the occupancy sensor, information associated with the one or more second reception signals for determining metering information associated with the one or more sources of water flow.

32. A bathing device, comprising:

a housing having an inlet configured to receive flowing water at a first flow rate through an opened a solenoid valve, which is in an open state, of the bathing device toward an outlet for use in the bath stall;

a processing device housed in the housing;

a temperature sensor comprised in the housing, wherein the processing device is configured to determine, via the temperature sensor, a temperature of the flowing water, wherein the temperature of the flowing water is variable;

a solenoid valve housed in the housing;

a pressure sensor housed in the housing, wherein the processing device is configured to determine, via the pressure sensor, pressure inside of the solenoid valve; and an occupancy sensor housed in the housing, the occupancy sensor being configured to transmit a transmission signal toward the bath stall and to receive a reception signal based on a reflection of the transmission signal, wherein the processing device is configured to determine whether the bath stall is occupied based on comparing the reception signal and one or more baseline signals, wherein responsive to determining that the temperature of the flowing water is at a steady state or greater than a temperature threshold and that the pressure is above a pressure threshold, the processing device is configured to decrease the first flow rate to below the first flow rate by at least partially closing the solenoid valve after determining that the bath stall is unoccupied, wherein responsive to determining that the temperature of the flowing water is at a steady state or greater than a temperature threshold and that the pressure is above a pressure threshold, the processing device is configured to maintain flow of the water at the first flow rate through the opened solenoid valve after determining that the bath stall is occupied, wherein the occupancy sensor is configured to:

transmit one or more second transmission signals toward one or more sources of water flow, receive one or more second reception signals based on reflection of the one or more second transmission signals, and transmit information associated with the one or more second reception signals for determining metering information associated with the one or more sources of water flow.

* * * * *